United States Patent
Kasper, II

(10) Patent No.: US 7,237,204 B2
(45) Date of Patent: Jun. 26, 2007

(54) CHANGE DETECTION IN A GRAPHICAL USER INTERFACE

(75) Inventor: David J. Kasper, II, Aliso Viejo, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 726 days.

(21) Appl. No.: 10/303,138

(22) Filed: Nov. 21, 2002

(65) Prior Publication Data

US 2004/0100488 A1  May 27, 2004

(51) Int. Cl.
*G06F 3/00* (2006.01)
*G06F 9/00* (2006.01)
*G06F 17/00* (2006.01)

(52) U.S. Cl. .................. 715/764; 715/780; 715/805
(58) Field of Classification Search .................. 715/805
See application file for complete search history.

(56) References Cited

U.S. PATENT DOCUMENTS

| | | | |
|---|---|---|---|
| 72,514 A * | 12/1867 | Tse et al. ..................... | 54/38.1 |
| 5,969,705 A * | 10/1999 | Fisher et al. ................. | 715/764 |
| 6,073,163 A * | 6/2000 | Clark et al. .................. | 709/203 |
| 6,424,636 B1 * | 7/2002 | Seazholtz et al. ........... | 370/295 |
| 6,973,600 B2 * | 12/2005 | Lau et al. .................... | 714/704 |

FOREIGN PATENT DOCUMENTS

WO   WO/0072514   * 11/2000

* cited by examiner

*Primary Examiner*—Raymond J. Bayerl
*Assistant Examiner*—Sabrina Greene
(74) *Attorney, Agent, or Firm*—John M. Powers; Fogg & Powers LLC

(57) ABSTRACT

A first process communicates to a second process what data will be used to display a graphical user interface element such as a window or screen. The second process determines if the data used to display the graphical user interface element has changed, and, if the data used to display the graphical user interface element has changed, communicates to a third process that the data used to display the graphical user interface element has changed. Moreover, the third process receives the communication that the data used to display the graphical user interface element has changed, and, in response to the communication that the data used to display the graphical user interface element has changed, displays the graphical user interface element.

18 Claims, 7 Drawing Sheets

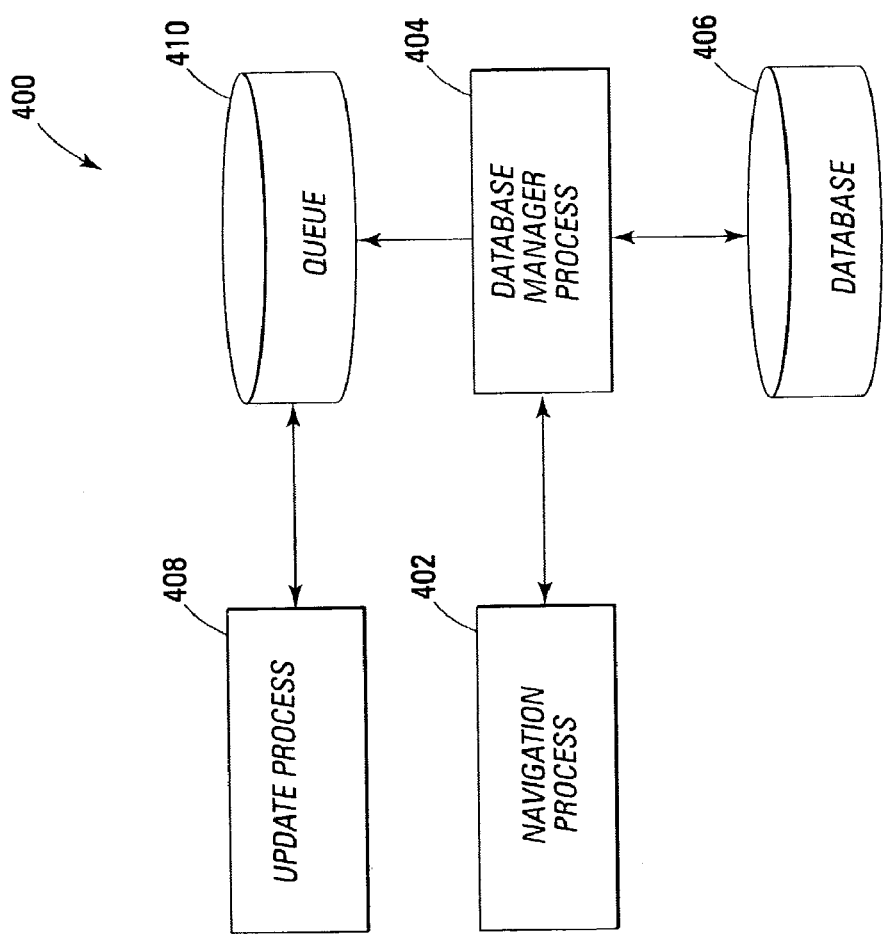

CHANGE DETECTION IN A GRAPHICAL USER INTERFACE

TECHNICAL FIELD

The following description relates to the management of a graphical user interface.

BACKGROUND

Software-based systems typically provide some type of user interface by which such a system requests input from a user and by which the system displays output for the user. A user can provide the requested input via an input device such as a keyboard and/or a mouse. The input device is attached to, or is in communication with, the system. The system can display output on an output device such as a computer monitor. The output device is also attached to, or is in communication with, the system.

One type of user interface is a graphical user interface ("GUI"). A GUI typically uses menus and/or other controls to request input from the user and windows and/or screens to display information for the user. A window (or other GUI element such as a screen) is typically constructed from one or more visual components such as text fields, images, scroll bars, and the like. The window is displayed by drawing on the output device each component of the window. Typically, this involves drawing the visible portions of each component. A portion of a component may not be visible, for example, because that portion has scrolled out of the window or has otherwise been hidden from view. The components can be created using, for example, text or bitmapped images. One example of a GUI is found in the WINDOWS 2000(R) operating system from Microsoft Corporation.

Another type of user interface is a command-line interface. A command-line interface typically provides a user with a command prompt at which the user types commands. One example of a command-line interface is the command-line interface used in the Internetworking Operating System found in switches and routers from CISCO Systems, Inc.

One application for a graphical user interface is in embedded systems. For example, a high-speed digital subscriber line 2 (HDSL2) line interface card typically includes an embedded control program. The embedded control program allows a user to use a GUI to view and/or change various operating parameters for the line interface card. In some implementations, the line card includes a craft port (for example, a RS-232 serial port) to which a user physically connects a portable computer or other device in order for the user and the embedded control program to communicate. In some implementations, the embedded control program and the user communicate via an embedded operations channel included in the main HDSL2 data link provided by the line card.

SUMMARY

In general, in one aspect, a computer program includes a storage medium tangibly embodying program instructions for receiving input from an input device and managing the display of a graphical user interface on an output device. The program instructions include instructions operable to cause at least one programmable processor to cause a first process to communicate to a second process what data will be used to display a graphical user interface element. The program instructions also include instructions operable to cause the at least one programmable processor to cause the second process to determine if the data used to display the graphical user interface element has changed, and, if the data used to display the graphical user interface element has changed, communicate to a third process that the data used to display the graphical user interface element has changed. The program instructions also include instructions operable to cause the at least one programmable processor to cause the third process to receive the communication that the data used to display the graphical user interface element has changed, and, in response to the communication that the data used to display the graphical user interface element has changed, display the graphical user interface element.

In general, in another aspect, a method of receiving input from an input device and managing the display of a graphical user interface on an output device includes, in a first process, communicating to a second process what data will be used to display a graphical user interface element. The method also includes, in the second process, determining if the data used to display the graphical user interface element has changed, and, if the data used to display the graphical user interface element has changed, communicating to a third process that the data used to display the graphical user interface element has changed. Moreover, the method includes, in the third process, receiving the communication that the data used to display the graphical user interface element has changed, and, in response to the communication that the data used to display the graphical user interface element has changed, displaying the graphical user interface element.

In general, in another aspect, a line interface card includes an upstream interface that sends and receives traffic to an upstream communication link, and a downstream interface that sends and receives traffic to a downstream communication link. The line interface card also includes an input-output interface adapted to communicate with a display device and with an input device, and a programmable processor coupled to the upstream interface, the downstream interface, and the input-output interface. Moreover, the line interface card also includes a storage medium coupled to the programmable processor. The storage medium tangibly embodies program instructions. The program instructions include instructions operable to cause the programmable processor to cause a first process to communicate to a second process what data will be used to display a graphical user interface element. The program instructions further include instructions operable to cause the programmable processor to cause the second process to determine if the data used to display the graphical user interface element has changed, and if the data used to display the graphical user interface element has changed, communicate that the data used to display the graphical user interface element has changed. The program instructions further include instructions operable to cause the programmable processor to cause a third process to receive the communication that the data used to display the graphical user interface element has changed, and, in response to the communication that the data used to display the graphical user interface element has changed, display the graphical user interface element.

Advantages may include one or more of the following. Embodiments of the methods and techniques described here can be used to decouple the navigational functionality (that is, the functionality that receives inputs indicating what GUI element should be displayed) from the GUI update functionality. This can simplify implementation and maintenance of the GUI. Moreover, the detection of changes to data used to display GUI elements can be centralized, which can reduce the need for change detection functionality, and the associated memory usage, to be distributed throughout the GUI implementation. This can result in more efficient use of processing resources and simplify implementation and maintenance of the GUI. Furthermore, in one implementation, a portion of a GUI element is redisplayed only when a change to the data used to draw that portion of the GUI element occurs. This can result in more efficient use of processing resources, in comparison to implementations that periodically redraw all of the components of a GUI element regardless of whether or not the data used to draw all of the components of the GUI element has changed. Embodiments of the methods and techniques described here are especially suitable for use in those embedded applications where it is desirable to limit the amount of processing resources needed for GUI management.

DRAWINGS

FIG. 4 is a block diagram of one embodiment of a program that manages a graphical user interface.

DETAILED DESCRIPTION

Figure 1:
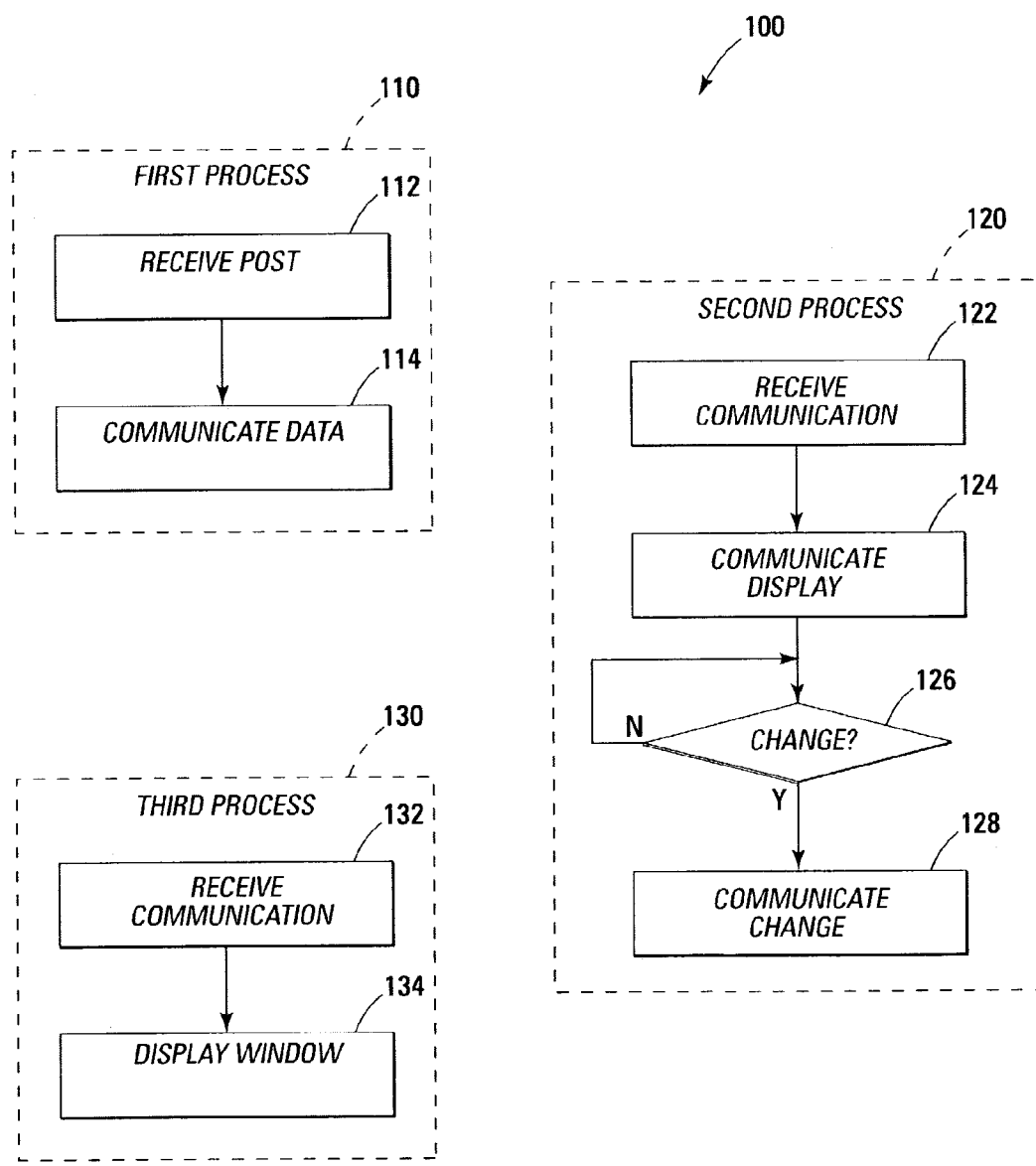
FIG. 1 is a flow diagram of one embodiment of a method of managing a graphical user interface.

FIG. 1 is a flow diagram of one embodiment of a method 100 of managing a graphical user interface. Method 100 includes three processes. A first process 110 receives an input from an input device that indicates that a GUI window should be displayed on an output device (block 112). Although the following description refers to a window, other GUI elements can be used such as a screen. In one embodiment, the window includes a plurality of components from which the window is constructed. In this embodiment, when the window is displayed, the visible portions, if any, of each component are displayed on the output device. The components can include, for example, forms, text fields, controls, or images. For example, the window can include text fields displaying the status of the system with which the GUI is associated. Each component from which the window is constructed is typically displayed using certain data. This data can include, for example, data indicating where a particular component should be displayed on the output device and data that indicates what information should be displayed by the component.

An input indicating that a window should be displayed can come from a user (for example, in the form of keyboard or mouse input) and/or from a system associated with the GUI. For example, in one embodiment, a user can use a keyboard or pointing device to select a menu item. The selection is an input that indicates that a window containing system information should be displayed. An example of an input coming from the system is an alarm input indicating that an alarm condition exists. The alarm input indicates that a window notifying the user about the alarm condition should be displayed.

Process 110 also includes communicating to a second process 120 what data will be used to display the window (block 114). The first process 110 identifies which data is needed to display the window ("the identified data") and communicates the identified data to the second process 120.

The identified data can be communicated to the second process 120 in several ways including, for example, passing the data or a pointer or other reference to the data to the second process 120. For example, data used to draw each component from which a window is constructed (the "component data") can be communicated to the second process 120 by passing a pointer or other reference to the component data.

Second process 120 receives the communication of the identified data (block 122) and communicates to a third process 130 that the window should be displayed (block 124). For example, for each item of data used to display the window, the second process 120 can send a message to the third process 130 indicating that the portion of the window drawn using that item of data should be displayed. The item of data, or a pointer or other reference to the item of data, can be included in each message. Alternatively, a single message can be sent to the third process 130 indicating that the third process 130 should display the window.

Then, the second process 120 determines if any of the identified data has changed (block 126). If any of the identified data has changed, the second process 120 communicates to the third process 130 that the identified data has changed (block 128). Otherwise, the second process 120 continues to check if any of the identified data has changed (looping back to block 126). By communicating to the third process 130 that the identified data has changed, the second process 120 is signaling to the third process 130 that the window should be updated and redisplayed. For example, the second process 120 can send a message to the third process 130 that indicates which item of the identified data has changed. Such a message can include, for example, the item of changed data or a pointer or other reference to the item of changed data.

The third process 130 receives each communication from the second process 120 (block 132). For example, if the second process 120 communicates with the third process 130 by sending one or more messages, the third process 130 receives the messages. For each received communication, the third process 130 displays the window in accordance with the communication (block 134). For example, if the second process 120 communicates to the third process 130 that the GUI element should be displayed, then the third process 130 removes the currently displayed window, if any, and displays the requested window. If the second process 120 communicates that a portion of the identified data for the currently displayed window has changed, then the third process 130 updates and redisplays the one or more portions of the window that are displayed using the changed data.

Method 100 can be used to decouple the navigational functionality (that is, the functionality that receives inputs indicating what GUI element should be displayed next) from the GUI update functionality. This can simplify implementation and maintenance of the GUI. Moreover, the detection of changes to data used to display GUI elements can be centralized, which can reduce the need for change detection functionality, and the associated memory usage, to be distributed throughout the GUI implementation. This can result in more efficient use of processing resources and simplify implementation and maintenance of the GUI. Furthermore, in one implementation of method 100, a portion of a GUI element is redisplayed only when a change to the data used to draw that portion of the GUI element occurs. This can result in more efficient use of processing resources, in comparison to implementations that periodically redraw all of the components of a GUI element regardless of whether or not the data used to draw all of the components of the GUI element has changed. Method 100 is especially suitable for use in those embedded applications in which it is desirable to limit the amount of processing resources needed for GUI management.

Figure 2:
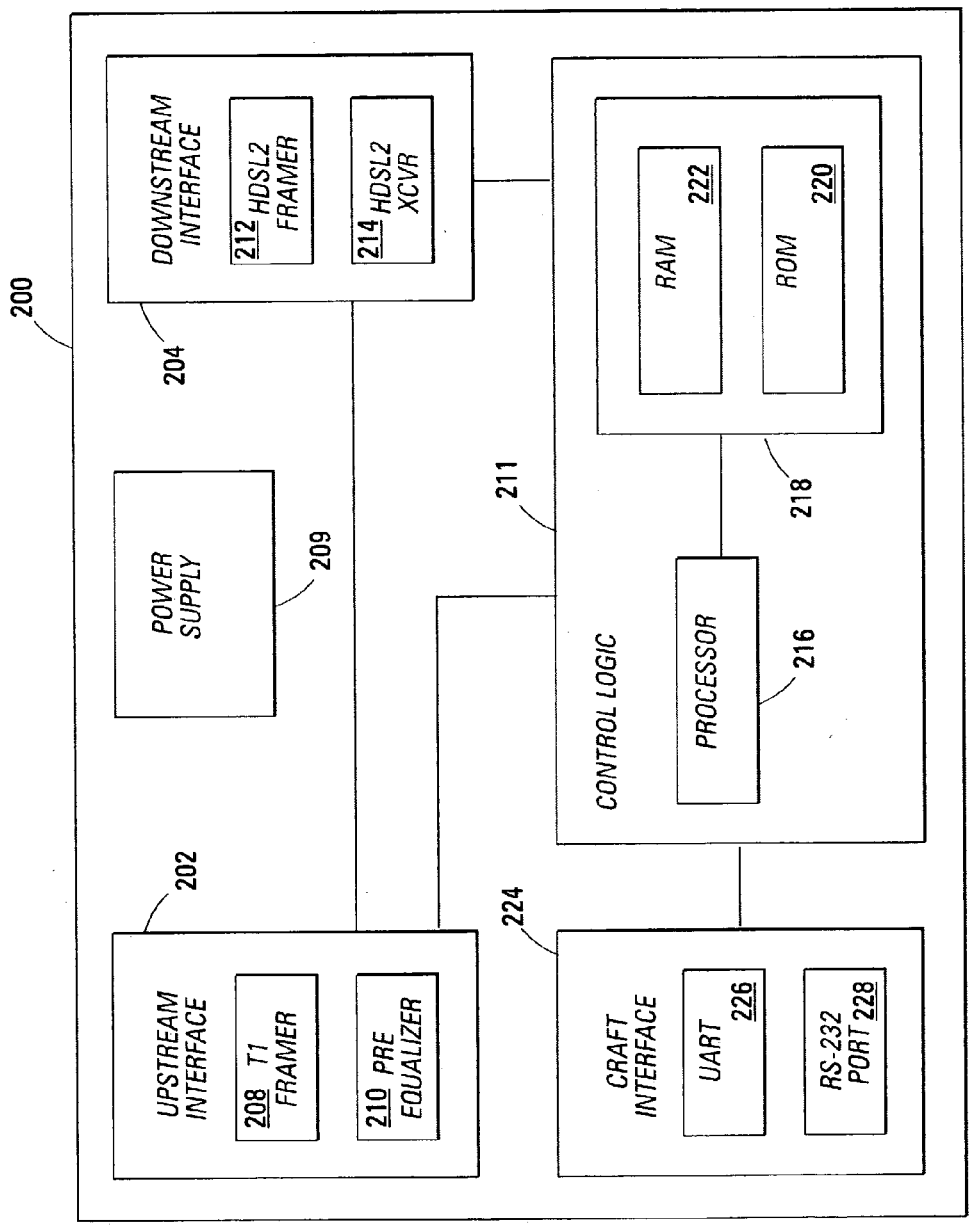
FIG. 2 is a block diagram of one embodiment of an HDSL line interface card.

FIG. 2 is a block diagram of one embodiment of an HDSL line interface card ("line card") 200 that can be used to implement the methods and systems described here. Line interface card 200 is used to send and receive DS1 traffic over an HDSL2 communication link using a single twisted-pair telephone line. The line card 200 includes an upstream interface 202 and a downstream interface 204. Upstream interface 202 and downstream interface 204 couple the line interface card 200 to an upstream link and a downstream link, respectively. In the embodiment shown in FIG. 2, the upstream link is a DSX-1 link that is cross-connected to a time division-multiplexing network. The upstream interface 202 couples the line card 200 to the DSX-1 link and includes, for example, a T1 framer 208 and a DSX-1 pre-equalizer 210. The downstream link is an HDSL2 link. The downstream interface 204 couples the line card 200 to the HDSL2 link and includes, for example, an HDSL2 framer 212 and an HDSL2 transceiver 214.

The line card 200 includes a power supply 209 for providing power to the components of the line card 200. The line card 200 also includes control logic 211. Control logic 211 includes a programmable processor 216 and a memory 218. Memory 218 includes both read-only memory ("ROM") 220 and random access memory ("RAM") 222. In addition, the line card 200 includes a craft interface 224. Craft interface 224 includes, for example, a universal asynchronous receiver-transmitter ("UART") 226 that couples an RS-232 serial port 228 to the processor 216.

A user can connect a portable computer or other data terminal to the serial port 228 and communicate with an embedded control program executing on the programmable processor 216. In one embodiment, the embedded control program allows the user to view and change system settings and view system performance, history, alarm, and inventory data. Alternatively, the user can communicate with the embedded control program over an embedded operations channel carried among the DS1 traffic handled by the line card 200. In either case, the embedded control program includes a process to manage a user interface such as described with respect to one or more of FIG. 1, above, and FIGS. 4, 5A, 5B, and 5C, below. Although FIG. 2 depicts an HDSL2 line interface card, other telecommunications devices can be used to implement the techniques described here. For example, G.SHDSL, HDSL, HDSL4, asynchronous digital subscriber line (ADSL), plain old telephone service (POTS), integrated services digital network (ISDN), and cable-modem line interface cards can be used.

Figure 3:
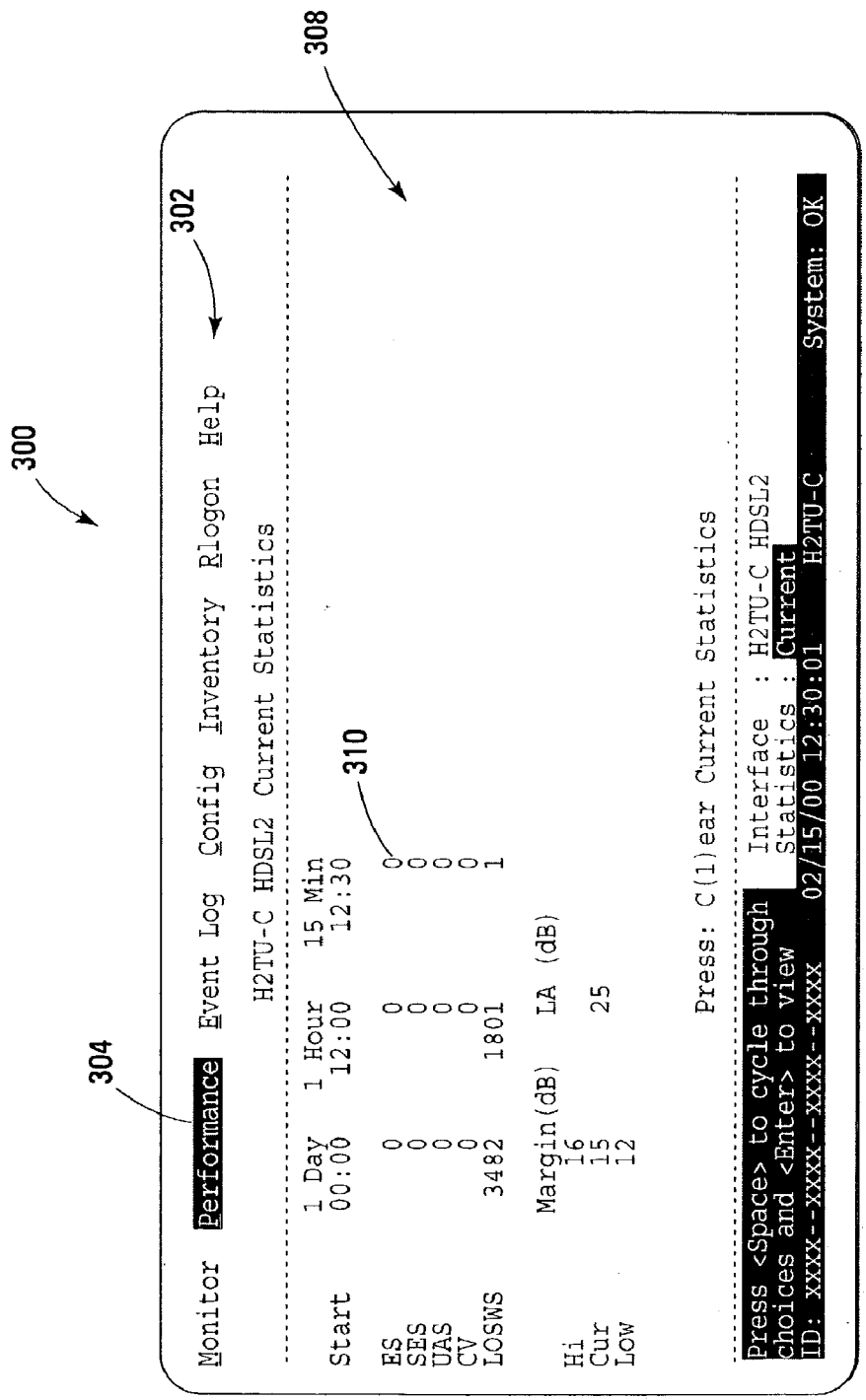
FIG. 3 is a schematic diagram of an exemplary graphical user interface.

FIG. 3 is a schematic diagram of an exemplary graphical user interface 300 that can be used with an embedded control program executing on line card 200. GUI 300 is provided by way of example and not by way of limitation. In other embodiments, other user interfaces that include windows or screens with one or more visual components such as text fields, images, scroll bars, and the like are managed using embodiments of the methods and techniques described here. The embedded control program includes one or more processes to manage GUI 300 such as the processes of FIGS. 1, 4, 5A, 5B, and 5C. In the example of FIG. 3, GUI 300 includes a menu bar 302 having several menu items 304 that a user can select, for example, using arrow keys to highlight a menu item 304 (for example, the PERFORMANCE menu item 304 is highlighted in FIG. 3) and then pressing the ENTER key to select the item. The GUI 300 also includes a window 308 in which various GUI components are displayed. For example, as shown in FIG. 3, various text fields 310 are displayed in the window 308. The text fields 310 display various performance data about the line card 200.

FIG. 4 is a block diagram of a program 400 that manages a GUI. Program 400 is one embodiment of method 100 and can be implemented as an embodiment of an embedded control program. In such an embodiment, the program 400 can manage, for example, the GUI 300 shown in FIG. 3. Program 400 includes a navigation process 402 that receives and processes navigation-related input from a user. For example, in an embodiment executed on the line card 200, the user can connect a portable computer or other data terminal to the serial port 228. Alternatively, the user can communicate with the program 400 via an embedded operations channel.

Navigation-related input includes keyboard presses and/or input from a pointing device such as a mouse. One type of input received by navigation process 402 is an input that indicates that a window should be displayed on the output device. For example, in an embodiment implementing GUI 300 shown in FIG. 3, a user can use a keyboard to select the PERFORMANCE menu item 304, which causes the program 400 to display a window 308 containing text fields 310 in which system information is displayed. The window 308 is displayed by displaying on the output device the visible portions, if any, of all the components from which the window 308 is constructed.

Program 400 also includes a database manager process 404, which maintains a database 406 in which system data is stored. In an embodiment implementing GUI 300, the system data is performance and configuration data for the line card 200. When the navigation process 402 receives an input indicating that a window should be displayed, the navigation process 402 communicates to the database manager process 404 what data is used to display the window. The navigation process 402 can, for example, send a message to the database manager process 404 that contains a pointer or other reference to component data used to display the components from which the window is constructed. In response, the database manager process 404 saves the pointer or other reference to the component data in the database 406 and sends a refresh-all message to an update process 408. The refresh-all message indicates that the update process 408 should display each component of the window. The update process 408 receives the message and then displays the window by displaying each component of the window on the output device (for example, by displaying on the output device the visible portions, if any, of each component of the window).

After that, the database manager 404 can detect when data used to display one or more of the window's components changes. The database manager 404 sends a separate update-component message to the update process 408 for each component having a change to the data used to draw that component. For each update-component message, the update process 408 receives the update-component message and updates the window by redisplaying the component on the output device (for example, by displaying the visible portions of the component associated with the message). The component is displayed using the changed component data.

The database manager process 404 sends a message to the update process 408 by writing the message into a queue 410. The update process 408 reads messages from the queue 410. Program 400 is typically implemented in software and/or firmware stored in read-only memory (ROM) and/or random access memory (RAM) and is executed on at least one programmable processor. For example, in one embodiment implemented using line card 200, program 400 can be implemented in firmware stored in ROM 220 and is executed on programmable processor 216.

Figure 5A:
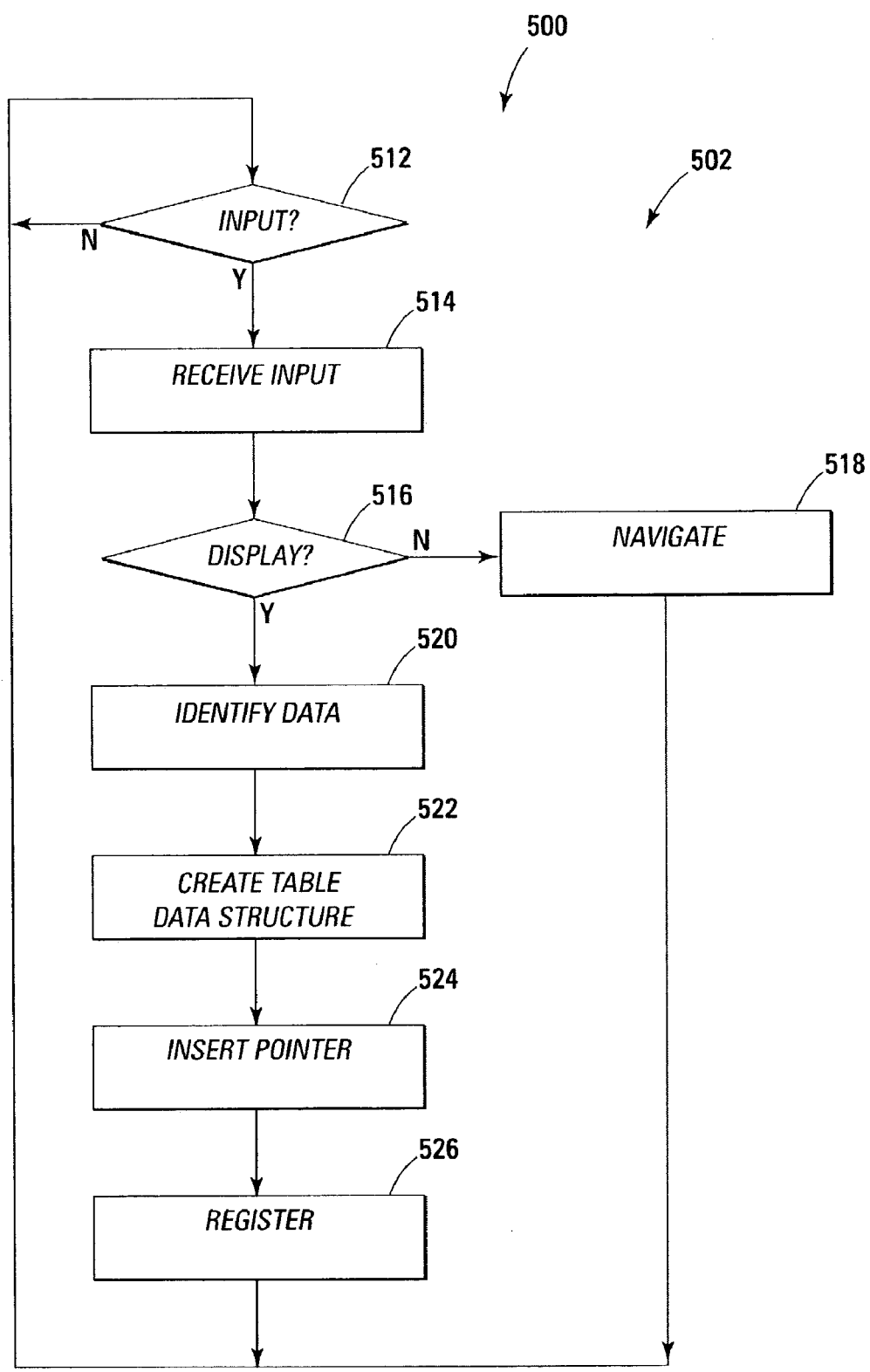
FIGS. 5A–5C are flow diagrams of one embodiment of a method of managing a graphical user interface.
Figure 5B:
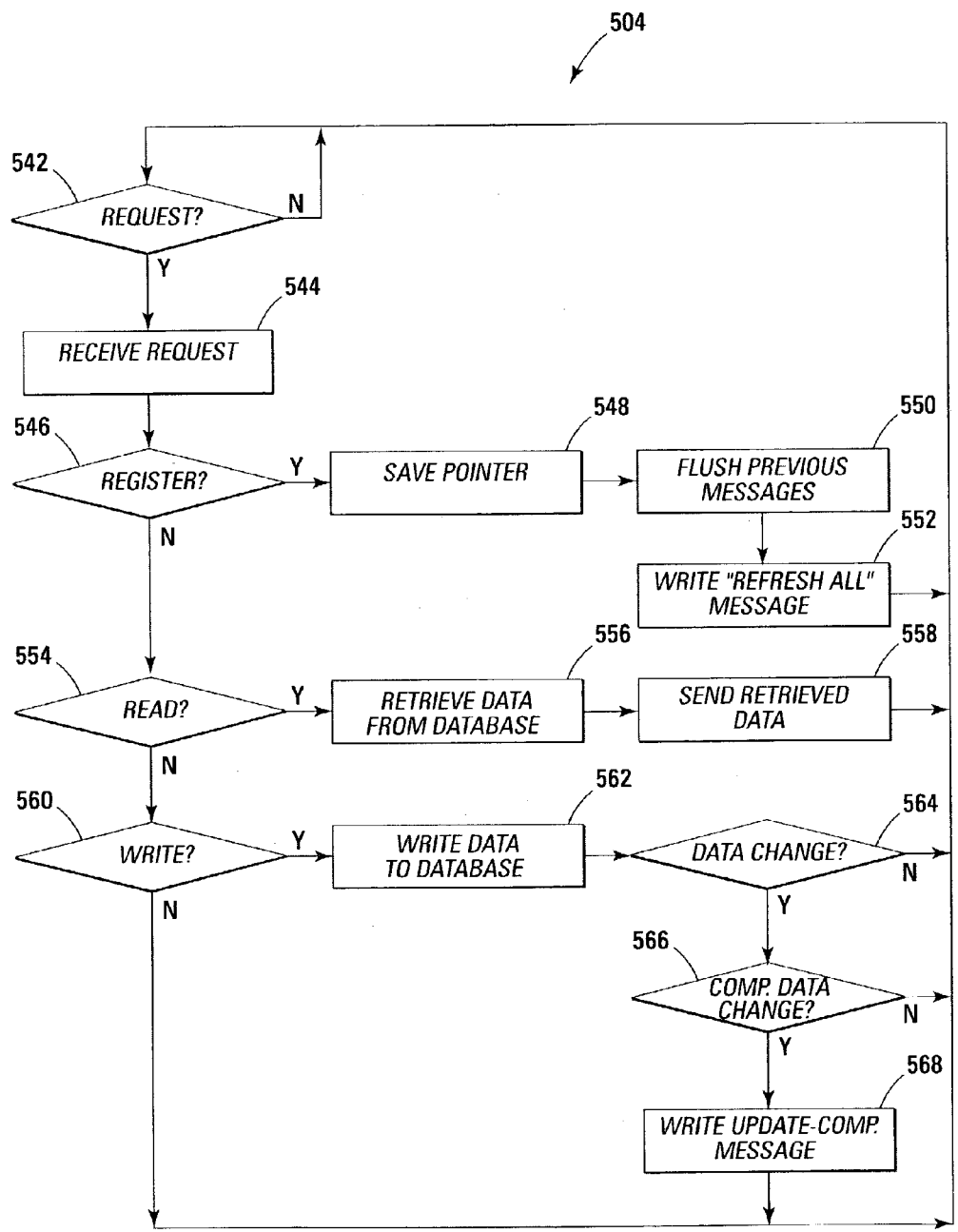
Figure 5C:
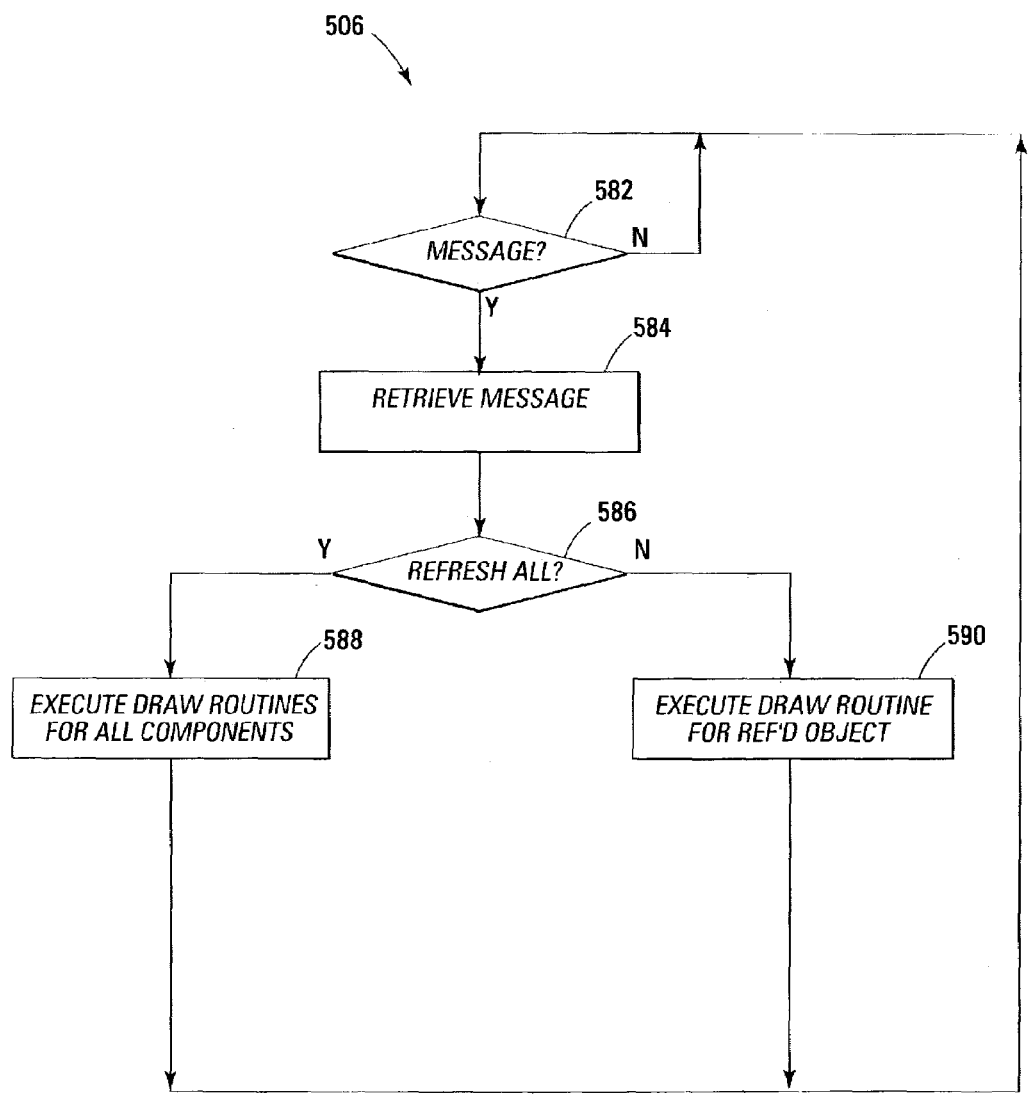

FIGS. 5A–5C are flow diagrams of a method 500 of managing a GUI. Method 500 is one implementation of the program 400 shown in FIG. 4. Method 500 includes a navigation process 502 shown in FIG. 5A, a database manager process 504 shown in FIG. 5B, and an update process 506 shown in FIG. 5C. If there is input (checked in block 512), the input is received (block 514). The input can come from a user (via an input device such as a keyboard or mouse) and/or can come from the system associated with the GUI. Next, it is determined if the input indicates that a particular window should be displayed (block 516). If the input does not indicate that a particular window should be displayed, then other navigation-related processing is performed (block 518). For example, a cursor can be moved or an edit to an editable text field can be received.

If the input indicates that a particular window should be displayed, then the process 502 identifies what data is required to display the window (block 520). In this embodiment, a window has one or more components from which the window is constructed. The components can be, for example, text fields, images, user controls such as a scroll bars, menus, etc. Each component from which the window is constructed has at least one object associated with that component. An object is a data structure containing data and one or more routines. Each object has a routine that draws the component associated with that object on the output device (the "draw routine"). The window is displayed by executing the draw routine for each component of the window. The draw routine accesses any data used to display the component. For example, this data can be stored within the object itself and/or the draw routine can retrieve the data from another source, for example, the database 406.

The navigation process 502 creates a table data structure (block 522) and inserts into the table a pointer or other reference to each of the objects required to display the window (block 524). The navigation process 502 then registers the table with the database manager process 504 (block 526). As a part of registering the table, the navigation process 502 passes to the database manager process 504 a pointer or other reference to the table.

The database manager process 504, shown in FIG. 5B, determines if a request to access the database 406 has been made (block 542). If a request has been made, the database manager process 504 receives the request (block 544). Otherwise, the database manager process 504 continues to check if a request has been made by looping back to block 542. Several different types of requests can be made. If the request was a request to register a table (checked in block 546), the database manager process 504 saves the pointer or other reference to the table in the database 406 (block 548). The database manager process 504 then flushes the queue 410 (block 550) and sends a refresh-all message to the update process 508 (block 552). Flushing the queue 410 removes any previous messages from the queue 410. The refresh-all message indicates that the update process 508 should display the window by displaying all of the window's components. The database manager process 504 then checks for additional requests (looping back to block 542).

If a request to read data from the database 406 (a "read request") is received (checked in block 554), the database manager process 504 retrieves the requested data from the database (block 556) and sends the received data to the requesting object (block 558). For example, as described below, when the update process 508 displays a component of the window, the update process 508 executes the draw routine for the object associated with that component. The draw routine can send a read request to the database manager process 504 requesting a particular item of data from the database 406. For example, in one embodiment executed on line card 200, configuration and performance data for the line card 200 can be stored in the database 406.

If a request to write data to the database 406 (a "write request") is received (checked in block 560), the database manager process 504 writes the data to the database 406 (block 562). For example, the request can specify a particular target record or object stored in the database 406 for the write operation, along with the data to be written. In one embodiment, a request to write data to the database 406 can come from a monitor process (not shown) that monitors various operational parameters of the line card 200. For example, the monitor process can periodically check those operational parameters. When a monitored operational parameter changes, the monitor process sends a write request to the database manager process 504 requesting that a new value for the operational parameter be written into the database 406. Also, the write request can come from the navigation process 502, for example, when a user uses the GUI to change a parameter or other data item displayed by the GUI.

The database manager process 504 then determines if the write request resulted in a change to the data stored in the database 406 (block 564). For example, the data specified in the write request may be the same data that is already stored in the target record or object. In this case, there is no change to the data stored in the database 406. If there has been a change, the database process manager 504 determines if the write request changed any component data used to display the components of the window (checked in block 566).

The database manager process 504, for example, goes through the saved object table to determine if any of the objects referenced by the table uses any data changed by the write request. This determination can be performed, for example, by executing a special routine included in the object. The special routine identifies what data is used by that object to display its associated component. If any data used to display a particular component was changed by the write request, an update-component message instructing the update process 508 to update the component is written to the queue 410 (block 568). For example, for each component that has component data changed by the write request, the database manager process 504 can write an update-component message to the queue 410 containing a pointer or other reference to that component's object. The update process 508, as described below, uses the messages to update and redisplay the component by executing the referenced object's draw routine.

When one or more messages are waiting in the queue (checked in block 582 shown in FIG. 5C), the update process 508 retrieves a message from the queue (block 584). If the message is a refresh-all message (checked in blocked 586), the update process 508 executes the draw routine for each component used to display the window (block 588). The refresh-all message can include a pointer or other reference to the object table. The update process 508 then executes the draw routines for all of the objects referenced in the object table in order to display the window on the output device. Each component's draw routine accesses any data needed to draw the component and, then, draws the component on the output device. The update process 508 then checks if any other messages are waiting in the queue 410 (looping back to block 582).

If the request is not a refresh-all message and is instead an update-component message, the update process 508 executes the draw routine for any object referenced by the message (block 590). The message can include a pointer or other reference to the object, which the update process 508 uses to execute that object's draw routine. The object's draw routine updates the component by accessing the data used to display the component (including any data that has changed). For example, this data can be stored within the object itself and/or the draw routine can retrieve the data from another source, for example, the database 406. The draw routine redraws the component on the output device. The update process 508 then checks if any other messages are waiting in the queue 410 (looping back to block 582).

Method 500 decouples the navigational functionality from the GUI update functionality, which can simplify implementation and maintenance of the GUI. Checking for changes to data used to display a GUI element as a part of handling write requests can be used to centralize change detection. As a result of such centralization, change detection functionality, and the associated memory usage, need not be distributed throughout the GUI implementation. This can result in more efficient use of processing resources and simplify implementation and maintenance of the GUI. Furthermore, in one implementation of method 500, a portion of a GUI element is redisplayed only when a change to the data used to draw that portion of the GUI element occurs. This can result in more efficient use of processing resources, in comparison to implementations that periodically redraw all of the components of a GUI element regardless of whether or not the data used to draw all of the components of the GUI element has changed. Method 500 is especially suitable for use in those embedded applications in which it is desirable to limit the amount of processing resources needed for GUI management.

The methods and techniques described here may be implemented in digital electronic circuitry, or with a programmable processor (for example, a special-purpose processor or a general-purpose process such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A line interface card, comprising:
   an upstream interface that sends and receives traffic to an upstream communication link
   a downstream interface that sends and receives traffic to a downstream communication link
   an input-output interface adapted to communicate with a display device and with an input device;
   a programmable processor coupled to the upstream interface, the downstream interface, and the input-output interface;
   a storage medium coupled to the programmable processor, tangibly embodying program instructions;
   wherein the program instructions include instructions operable to cause the programmable processor to:
      cause a first process to:
         communicate to a second process what data will be used to display a graphical user interface element;
      cause the second process to:
         determine if the data used to display the graphical user interface element has changed; and
         if the data used to display the graphical user interface element has changed, communicate to a third process that the data used to display the graphical user interface has changed; and
      cause the third process to:
         receive the communication that the data used to display the graphical user interface has changed; and
         in response to the communication that the data used to display the graphical user interface element has changed, display the graphical user interface element;
   wherein the downstream communication link is an HDSL2 link and the downstream interface includes:
      an HDSL2 framer in communication with the upstream interface and adapted to communicate with the HDSL2 link; and
      an HDSL2 transceiver coupled to the HDSL2 framer and adapted to communicate with the HDSL2 link.

2. The line interface card of claim 1, wherein the program instructions further include instructions operable to cause the programmable processor to:
   cause the first process to:
      identify the data used to display the graphical user interface element;
      create a data structure that refers to the data used to display the graphical user interface element.

3. The line interface card of claim 2, wherein the program instructions operable to cause the at least one programmable processor to cause the first process to communicate to the second process what data will be used to display the graphical user interface element include program instructions operable to cause the first process to register the data structure with the second process.

4. The line interface card of claim 3, wherein the second process comprises a database manager process having a database associated therewith.

5. The line interface card of claim 4, wherein the program instructions further include instructions operable to cause the at least one programmable processor to:

cause the database manager to save a pointer to the data used to display the graphical user interface element in the database when the first process registers the data structure.

6. The line interface card of claim 2, wherein the data structure comprises a table having at least one table entry referencing an object associated with a component of the graphical user interface element.

7. The line interface card of claim 6, wherein the object references data used to display the component associated with the object.

8. The line interface card of claim 6, wherein the object includes a draw routine that displays the component associated with the object.

9. The line interface card of claim 4, wherein the program instructions operable to cause the at least one programmable processor to cause the second process to determine if the data used to display graphical user interface element has changed include instructions operable to cause the database manager to determine if the data used to display the graphical user interface element has changed during a write to the database.

10. The line interface card of claim 1, wherein the program instructions operable to cause the at least one programmable processor to cause the second process communicate that the data used to display the graphical user interface element has changed include instructions operable to cause the second process to write a message to a queue.

11. The line interface card of claim 10, wherein the program instructions operable to cause the at least one programmable processor to cause the third process to receive the communication that the data used to display the graphical user interface element has changed include program instructions operable to cause the third process to read the message from the queue.

12. The line interface card of claim 1, wherein the first process comprises a navigation process.

13. The line interface card of claim 1, wherein the third process comprises an update process.

14. The line interface card of claim 1, wherein the graphical user interface element comprises a window having fields in which at least a portion of the data used to display the graphical user interface element is displayed.

15. The line interface card of claim 1, wherein the program instructions further include instructions operable to cause the at least one programmable processor to cause the first process to receive an input that indicates that a graphical user interface element should be displayed.

16. The line interface card of claim 15, wherein the input is at least one keyboard press.

17. The line interface card of claim 1, wherein the upstream communication link is a DSX-1 link and the upstream interface includes:
   a T1 framer in communication with the downstream interface and adapted to communicate with the DSX-1 link; and
   a pre-equalizer coupled to the T1 framer and the downstream interface and adapted to communicate with the DSX-1 link.

18. A line interface card, comprising:
   an upstream interface that sends and receives traffic to an upstream communication link
   a downstream interface that sends and receives traffic to a downstream communication link
   an input-output interface adapted to communicate with a display device and with an input device;
   a programmable processor coupled to the upstream interface, the downstream interface, and the input-output interface;
   a storage medium coupled to the programmable processor, tangibly embodying program instructions;
   wherein the program instructions include instructions operable to cause the programmable processor to:
      cause a first process to:
         communicate to a second process what data will be used to display a graphical user interface element;
      cause the second process to:
         determine if the data used to display the graphical user interface element has changed; and
         if the data used to display the graphical user interface element has changed, communicate to a third process that the data used to display the graphical user interface has changed; and
      cause the third process to:
         receive the communication that the data used to display the graphical user interface has changed; and
   in response to the communication that the data used to display the graphical user interface element has changed, display the graphical user interface element;
   wherein the upstream communication link is a DSX-1 link and the upstream interface includes:
      a T1 framer in communication with the downstream interface and adapted to communicate with the DSX-1 link; and
      a pre-equalizer coupled to the T1 framer and the downstream interface and adapted to communicate with the DSX-1 link.

* * * * *